United States Patent [19]
Primm et al.

[11] 3,816,745
[45] June 11, 1974

[54] OPTICALLY-COUPLED SENSING AND CONTROL SYSTEM

[75] Inventors: Raymond Primm; William L. McKeown, both of Roswell; James S. Copeland, Dexter, all of N. Mex.

[73] Assignee: Innovation Industries Incorporated, Roswell, N. Mex.

[22] Filed: Nov. 20, 1972

[21] Appl. No.: 307,974

[52] U.S. Cl. ............................ 250/221, 340/258 B
[51] Int. Cl. ............................................ H01j 39/12
[58] Field of Search ........... 250/221, 222, 223, 504, 250/510, 214; 317/124, 127; 340/258 B; 343/5 PD

[56] References Cited
UNITED STATES PATENTS

| | | | |
|---|---|---|---|
| 2,269,340 | 1/1942 | Gulliksen | 250/221 |
| 3,398,290 | 8/1968 | Basehore | 250/221 |
| 3,444,544 | 5/1969 | Pearson | 250/221 |
| 3,605,082 | 9/1971 | Matthews | 250/221 |
| 3,619,629 | 11/1971 | Matthews | 250/221 |
| 3,641,549 | 2/1972 | Misek | 340/258 B |
| 3,680,047 | 7/1972 | Perlman | 340/258 B |
| 3,704,396 | 11/1972 | MacDonald | 317/124 |
| 3,711,846 | 1/1973 | Schlisser | 250/221 |
| 3,719,938 | 3/1973 | Perlman | 340/258 B |
| 3,723,737 | 3/1973 | Zeldman | 250/221 |

*Primary Examiner*—James W. Lawrence
*Assistant Examiner*—D. C. Nelms
*Attorney, Agent, or Firm*—Clegg & Cantrell

[57] ABSTRACT

In an optically coupled sensing and control system, a train of light wave pulses are generated and directed along a first pathway in a first direction with the light wave pulses in said pathway diverging by a predetermined amount. Reflector apparatus receives the light wave pulses in said first pathway and directs the received pulses in a second direction opposite the first direction along a second pathway spatially displaced from the first pathway. Detection apparatus is positioned in the second pathway to detect whether the light waves in either the first or second pathway are interrupted. When light wave pulses are detected by the detection apparatus, an enabling signal is generated and then applied via gating circuitry to memory circuitry. The gating circuitry opens for a predetermined period of time after each light wave pulse is generated to allow any enabling signal to pass to the memory circuit. The memory circuit is reset in response to the generation of each light wave pulse and is set upon receipt of an enabling signal via the gating circuitry from the detecting apparatus. The memory circuit generates an output signal whenever the circuit is in the set condition. Thus, when the light wave pulses in either the first or second pathway are interrupted, the memory circuit is placed in a reset condition and when the light wave pulses are uninterrupted, the memory circuit is alternately placed in the set and reset conditions.

17 Claims, 2 Drawing Figures

PATENTED JUN 11 1974          3,816,745

OPTICALLY-COUPLED SENSING AND CONTROL SYSTEM

BACKGROUND OF THE INVENTION

This invention relates to a photoelectric control system and more particularly to an optically coupled sensing and control system for use in automatic elevator systems, automatic baggage and freight handling systems and the like.

Photo electric control apparatus for use in controlling passenger or freight elevator doors, etc. are well-known in the art. Typically, such apparatus provides a light beam source positioned on one side of the door opening and a light beam detecting or receiving device positioned on the other side of the door opening to detect the beam of light or conversely the interruption of the beam of light. Such apparatus provides for reopening or holding open the elevator doors whenever the light beam is blocked by some opaque object such as a person or item of freight. In such prior art systems, the light is typically focused into collimated beams to conserve as much light energy as possible. Such focusing necessitates fairly precise alignment of the light beam source and the light detecting device and this complicates installation and maintenance of the system.

It is an object of the present invention to provide a photo electric sensing and control system which is easy to install and maintain and which does not require precise alignment to insure proper operation.

It is frequently desirable in elevator door control systems of the type described above, to provide two substantially parallel beams of light spaced apart for the detection of high and low objects passing through the door opening. With two beams of light, the likelihood of prompt detection of an object passing through the door opening is increased. Although the provision for two spaced light beams is desirable, the cost of providing two sets of light sources and light detecting devices might outweigh the advantages of providing the two beams.

It is an object of the present invention to provide a photo electric sensing and control system in which two spaced substantially parallel beams of light may be provided using a single light source and a single light detecting unit.

It is another object of the present invention to provide such a system in which all active electrical and electronic components of the system may be located in one self-contained package.

False operation of a photo electric control system can be caused by noise arising from without the system and also noise generated internally in the system. For example, extraneous light impinging on the light detecting unit could trigger a spurious response to such light and thereby result in false operation of the system. Similarly, internal noise caused, for example, by amplifier circuits, signal generating circuits, etc. of the system could cause such false operation.

It is an object of the present invention to provide a photo electric sensing and control system having a high degree of immunity to both internally and externally generated noise.

BRIEF DESCRIPTION OF THE DRAWING

The above and other objects and advantages of the present invention will become more apparent from the following detailed description presented in connection with the accompanying drawing in which.

DETAILED DESCRIPTION

Figure 1:
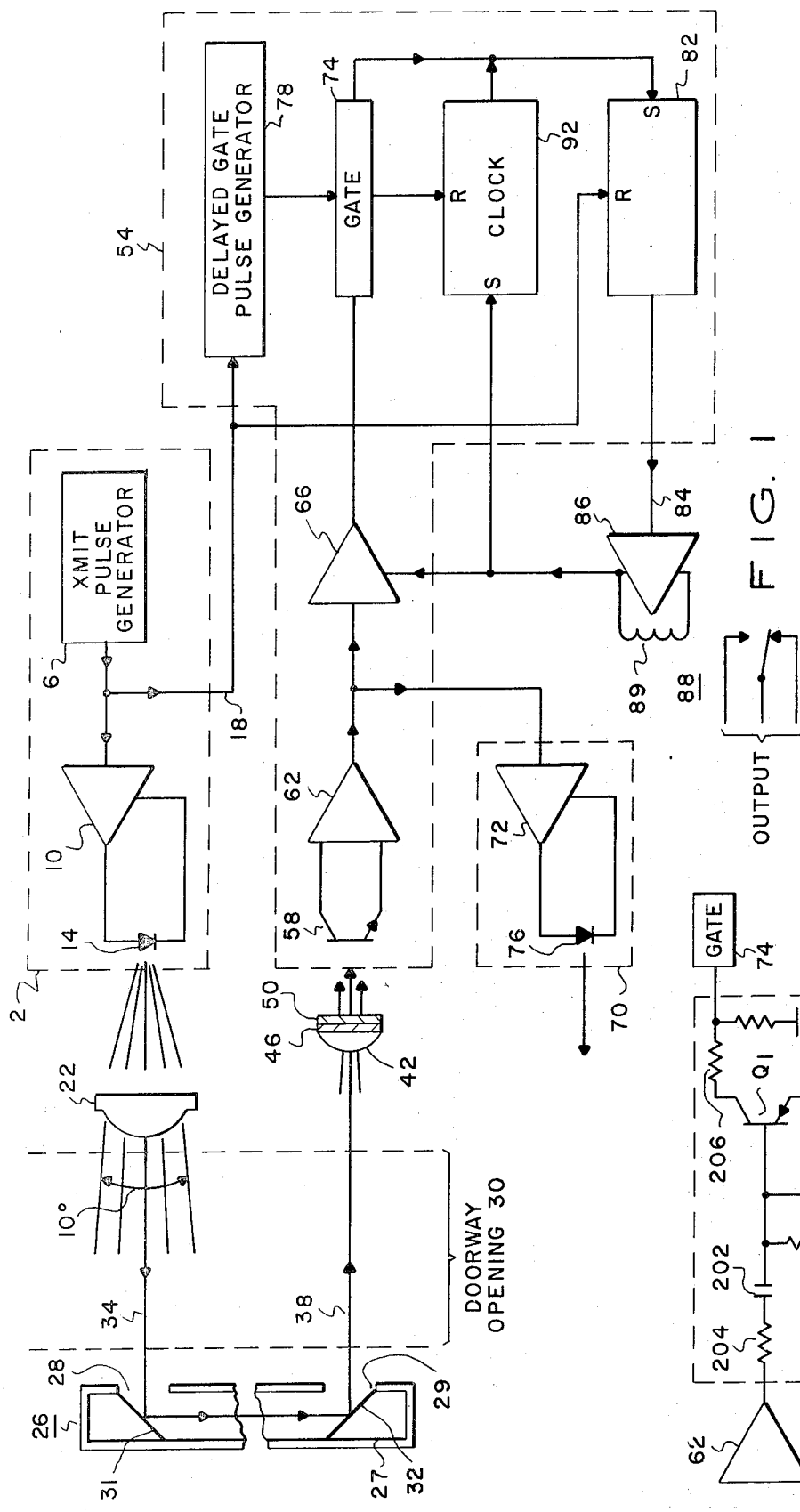
FIG. 1 shows one illustrative embodiment of a photo electric control system made in accordance with the principles of the present invention and FIG. 2 shows the circuit of the controlled threshold amplifier of FIG. 1.

FIG. 1 diagrammatically shows an optically-coupled sensing and control system for controlling, for example, the opening and closing of elevator doors. The system includes an infrared light source 2 comprising a transmit pulse generator 6, a light-emitting diode 14, and a light-emitting diode driver 10. The pulse generator 6 generates a train of "transmit" pulses which are applied to the light-emitting diode driver 10 and also to a lead 18. The light-emitting diode driver 10, in response to each transmit pulse received from the pulse generator 6, applies a current pulse to the light-emitting diode 14, thereby causing the diode to emit a burst or pulse of infrared light energy or light waves.

The repetition rate and pulse duration of the pulses generated by the pulse generator 6 are chosen to provide a high ratio of "off" to "on" time for the light-emitting diode 14. An exemplary ratio is 200 to 1. The reason for the high ratio is to allow dissipation of heat to occur between pulses, such heat being caused by ohmic internal losses in the light-emitting diode. In this manner, the temperature of the light-emitting diode is maintained within safe limits and yet the light-emitting diode can be pulsed to emit its maximum intensity light pulse.

The pulse generator 6 might illustratively be a one shot multivibrator triggered on each half cycle of a standard 60 cycle A.C. line voltage. In this case, the pulse repetition rate would be 120 pulses per second. Alternatively, a free running multivibrator circuit could be utilized as the pulse generator 6. The light-emitting diode driver 10 might illustratively comprise two transistors connected in the well-known Darlington pair configuration.

Utilization of a light-emitting diode, although more costly than the generally previously used tungsten filament lamps, provides a long-life and reliable light source which can be turned on and off at very high rates in accordance with the present invention. This modulation of the light source enables greater discrimination of true signals from spurious signals as will be more fully described later.

The pulse of infrared light generated by the light-emitting diode 14 diverge therefrom and are gathered by a field lens 22 which reduces the degree of divergence of the light and directs the light toward a reflector assembly 26 across a doorway opening 30. The lens 22 is shown in the drawing as being larger than it would typically be in practice relative to the size of the reflector assembly 26—to better illustrate the function of the lens 22 in reducing the divergence of the light waves from the light-emitting diode 14. Illustratively, the degree of divergence of the light wave from the lens 22 might be 10° as indicated in the drawing. Unlike prior art systems, a collimated beam of light is not produced and thus small amounts of misalignment between the light source and the light detecting apparatus will not seriously degrade the operation of the system. Because precise alignment is not necessary, installation and maintenance of the system is simplified.

The light is directed by the lens 22 in a first pathway or beam generally designated by the numeral 34 and is received by the reflector assembly 26 which redirects the light back across the doorway opening 30 along a second pathway or beam 38 in a direction generally opposite that of the light in pathway 34. The pathways 34 and 38, as indicated in the drawing, are spatially displaced from one another to provide high and low light detection beams for the doorway opening 30.

The reflector assembly 26 is a periscope-type device comprising an elongated tube 27 having spaced openings 28 and 29 on one side of the tube. Mirrors 31 and 32 are positioned in the tube at the openings 28 and 29 respectively at approximately a right angle with respect to each other. Each mirror 31 and 32 is oriented at an angle of approximately 45° with respect to the long axis of the tube 27 and also with respect to pathways 34 and 38 respectively as shown in the drawing. Mirror 31 receives the light in pathway 34 and directs it down the center of the tube 27 to the mirror 32 which redirects the light into pathway 38 toward a light collecting lens 42.

Utilization of the reflector assembly 26 on one side of the doorway opening 30 eliminates the need for two sets of light sources and light detecting units while providing two light beams and also enables packaging the active electronic components of the system on one side of the doorway opening in one self-contained package.

The light in pathway 38 is collected by lens 42 and passed through a filter comprised of two polarizers 46 and 50 secured to the lens 42. The filtered light is then received by a phototransistor 58 of a light receiving unit 54. The polarizers 46 and 50 are provided to remove from the light impinging on the phototransistor any extraneous light in the visible portion of the light spectrum which might otherwise cause false operation of the system. Polarizer 46 is oriented so that its polarization axis is oriented at right angles to the polarization axis of the polarizer 50. In this configuration, with proper choice of polarization material, substantially all light in the pathway 38 which is in the visible portion of the light spectrum is filtered out while light in the infrared portion is not filtered. Material which can be used for the polarizers 46 and 50 to accomplish this is a material identified as type KN36 linear polarizer manufactured by Polaroid Corporation.

The described filter arrangement provides an inexpensive but effective filter for excluding a large percentage of extraneous light from impinging on the phototransistor 58. The lens 42 is positioned so that the focal point of the lens 42 falls to the right of the phototransistor 58, i.e., the phototransistor is located "inside" the focal point of the lens 42. By so positioning the lens 42 with respect to the phototransistor 58, a light beam of larger cross-section is caused to impinge on the phototransistor than would be the case if the phototransistor 58 were located at the focal point of the lens 42. With this arrangement, greater misalignment between the light source and the light detecting apparatus can be tolerated because of the greater likelihood that some portion of the light beam will impinge on the light detecting apparatus.

The funtion of the receiving unit 54 is to determine when either of the light beams 34 or 38 is blocked. When either is blocked, a signal is generated to prevent the elevator doors from closing on the doorway opening 30. When neither beam of light is blocked, the pulses of light are focused on the phototransistor 58 (or some other photodetector such as a photodiode, etc.) causing the phototransistor to conduct corresponding pulses of current between its emitter electrode and collector electrode. these current pulses are applied to a high pass amplifier 62 which amplifies and passes those signals having frequency components in a range of, for example, from 3,000 to 100,000 Hertz. The frequency selective characteristics of the amplifier 62 reduce the effects of any modulated extraneous light received by the receiving unit 54.

The amplified pulse signal from the amplifier 62 is fed to a controlled threshold amplifier 66 and to an alignment indicator 70 which will be discussed later. If a signal applied to the controlled threshold amplifier 66 exceeds a predetermined first threshold level, the amplifier 66 is caused to generate an output signal which is applied to a gate circuit 74. as a result of operations to be described later, a relay driver circuit 86 is caused to generate a signal which is applied to the amplifier 66 causing it to "latch" to a second threshold level lower than the first level. The amplifier 66 will then continue to generate an output signal until the input thereto falls below this second threshold level, at which time the amplifier "latches" back to the first threshold level in response to the removal of the "latch up" signal by the relay driver circuit 86. In this manner, the controlled threshold amplifier 66 prevents marginal system operation, i.e., an on-again, off-again type of operation, when the input signal to the receiving unit 54 is at or near the level sufficient to cause operation of the unit. If such were not the case and, for example, relays were used in the output circuitry, the relays might be caused to "chatter." In the system of the present invention, once the input signal reaches a sufficiently high level, the system responds and continues to respond until the input signal falls substantially below the initial threshold level.

Figure 2:
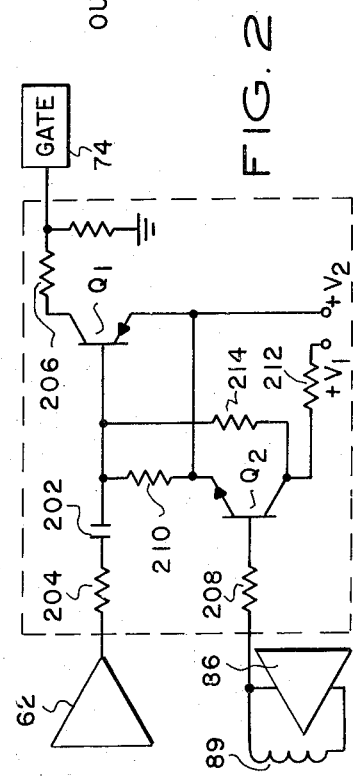

One illustrative embodiment of the controlled threshold amplifier 66 is shown in detail in FIG. 2. The FIG. 2 circuitry includes a PNP transistor Q1 coupled via its base electrode through a capacitor 202 and a resistor 204 to the output of amplifier 62. The collector of the transistor Q1 is coupled via a resistor 206 to the gate circuit 74 while the emitter of the transistor is connected to a positive voltage source V2. The FIG. 2 circuit further includes an NPN transistor Q2 whose base electrode is coupled via a resistor 208 to the relay driver 86. The emitter of the transistor Q2 is coupled to the emitter of the transistor Q1 and also via a resistor 210 to the base of the transistor Q1. The collector of the transistor Q2 is connected via a resistor 212 to a positive voltage source V1 and also connected via a resistor 214 to the base of the transistor Q1.

Assuming that the light beam is unblocked, the amplifier 62 applies negative-going pulses via the resistor 204 and the capacitor 202 to the base of the transistor Q1. With each such negative-going pulse, the transistor Q1 is turned on so that positive-going pulses are applied from the voltage source +V2 (which might illustratively be +5 volts) via the transistor Q1 and the resistor 206 to the gate circuit 74. As will be discussed later, this results in the relay driver circuit 86 assuming an unoperated condition in which positive voltage is applied via the resistor 208 to the base of the transistor Q2 turning the transistor on. In this condition, the base of the transistor Q1 is connected via two parallel paths (one being resistor 210 and the other being resistor 214 and transistor Q2) to the voltage source +V2. The base of the transistor Q1 is thus just slightly less positive than the emitter thereof so that small negative-going pulses applied to the base of the transistor will cause the transistor to conduct. In this condition, the amplifier of FIG. 2 is "latched" to the so-called second threshold level.

When the beam becomes blocked or partially blocked so that the negative-going pulses from the amplifier 62 are insufficient to cause the transistor Q1 to conduct, circuitry (to be described later) causes the relay driver circuit 86 to operate so that a near zero voltage is applied via the resistor 208 to the base of the transistor 202. This turns off the transistor Q2 so that the voltage at the base of the transistor Q1 is equal to +V1 (which might illustratively be 15 volts) minus the voltage drop across resistors 212 and 214. With the voltage at the bsse of the transistor Q1 being greater than the voltage at the emitter thereof, the magnitude of the negative-going signal necessary to cause the transistor Q1 to conduct increases. In this condition, the FIG. 2 circuitry is at the so-called first threshold level.

When negative-going signals of sufficient magnitude are applied by the amplifier 62 to the base of the transistor Q1, the transistor is caused to conduct and the FIG. 2 circuitry is caused to "latch" to the second threshold level as described above.

The signal from the amplfiier 66 is applied to a gate circuit 74 which controls the passage of the signal therethrough in response to a signal from a delayed gate pulse generator 78. The latter signal determines the period of time during which the gate circuit 74 is open to pass the signal from the amplifier 66. The delayed gate pulse generator 78 responds to each transmit pulse generated by the pulse generator 6 by applying a pulse of predetermined duration to the gate circuit 74. The delayed gate pulse generator 78 is triggered by the trailing edge of each transmit pulse (and thus is "delayed") so that the gate circuit 74 is opened after a corresponding transmit pulse has been generated. The gate circuit 74 is open for only a short period of time, with this period corresponding to the time when a signal should be received from the amplifier 66 provided the light beam is not being blocked. Since the gate circuit 74 is closed at all other times, spuriously generated signals are screened by the gate circuit. This results in a high noise rejection capability of the receiving unit 54 especially of internally generated system noise or cross talk such as that which might be generated, for example, by the pulse generator 6. Since the gate 74 is opened after the pulse generator 6 generates a pulse, noise produced in the course of generating the pulses are screened out by the gate circuit 74. An illustrative period of time during which the gate circuit 74 might be opened is 20 microseconds or 0.25 percent of the time.

The delayed gate pulse generator 78 could be a simple one-shot multivibrator coupled through a capacitor-resistor network to the transmit pulse generator 6.

The output signal from the gate circuit 74, when the light beam is not blocked, is a train of pulses of duration equal to the period of the gate circuit opening. Since the time spacing between light pulses is relatively long, for example, 8,333 microseconds if a 60 Hertz power source is utilized to drive the pulse generator 6, conversion of the output signal from the gate 74 into a more useful "on-off" form of system output signal is desirable. This is accomplished utilizing a resettable memory circuit 82. The train of pulses from the gate circuit 74 are applied to a "set" input of the memory 82 so that the memory is placed in a "set" condition each time a pulse is received (each pulse, of course, representing a pulse of infrared light being received by the phototransistor 58). A second input signal to the memory circuit 82 is derived from the pulse generator 6 and this input signal causes the memroy circuit 82 to assume a "reset" condition. This latter input signal resets the memory 82 during each transmit pulse generated by the pulse generator 6. Because of the delay built into the delayed gate pulse generator 78, the "reset" input occurs prior to the "set" input by the amount of the built-in delay. If the light beam is not blocked, the train of pulses appearing at the "set" input will repeatedly set the memory shortly after it has been reset with each transmit pulse. While in the "set" condition, the memory 82 generates a "low" signal on lead 84 so that when the light beam is not blocked, this "low" signal will be generated by the memory circuit 82 except during the "reset" periods which are relatively short. During the "reset" periods, a "high" signal is generated by the memory circuit 82. The net result is a high ratio of "set" to "reset" time for the memory circuit 82, whenever the light beam is not blocked.

When the light beam is blocked, the next "reset" pulse to occur resets the memory circuit 82 where it remains until the beam is unblocked. The output of the memory circuit 82 therefore consists essentially of a steady "low" signal when the light beam is not blocked and a steady "high" signal when the beam is blocked.

The output of the memory circuit 82 may be utilized in a variety of ways to control the elevator doors. One exemplary arrangement for utilizing the signal is shown in FIG. 1 and includes a relay driver 86 and a relay 88. The relay driver 86 responds to a "high" signal from the memory circuit 82 by energizing the coils 89 of the relay 88 to cause the relay 88 to operate. In other words, when the light beam is blocked, the relay is operated and when the light beam is unblocked, the relay is unoperated.

When the relay driver 86 energizes the coil 89, the signal energy or current is also applied to the controlled threshold amplifier 66 and to a timing circuit 92. The operation of the controlled threshold amplifier in response to this signal was discussed earlier. Operation of the timing circuit 92 will next be described.

When photo electric control systems are used to reopen or hold open elevator doors, a hazard exists to the safety of the users if a certain precaution is not taken. Specifically, if a fire should occur in the building which houses the elevator, and the elevator arrives at a floor where the fire exists, the doors could be held open by smoke blocking the light beam. Because safety requires that the elevator not be allowed to run while the doors are open, a passenger could be trapped, with the doors open, at the floor of the fire. The timing circuit 92 of FIG. 1 is provided to overcome this problem.

Each time the light beam is blocked so that the relay driver 86 energizes the coil 89, a signal is applied to a "set" input of the timing circuit 92 to thereby cause the timing circuit to commence timing. If the beam becomes unblocked, a signal from the controlled threshold amplifier 66 is applied via the gating circuit 74 to a "reset" input of the timing circuit 92 thereby placing the timing circuit in a "reset" condition in which the timing circuit does not time. If the timing circuit 92 is not reset within a predetermined period of time, i.e., if the light beam remains blocked for this predetermined period of time, the timing circuit 92 applies a signal to the "set" input of the memory 82 thereby causing the memory to assume a set condition. The operation of the FIG. 1 system thereafter is the same as if the light beam had remained unblocked as previously described (i.e., the memory circuit 82 generates a "low" signal etc.).

In order to align the light source 2 and the light receiving circuitry, an alignment indicator 70 is provided. The indicator 70 includes an indicator driver 72 and an indicator lamp 76. The indicator driver 72 receives the signals from the high pass amplifier 62, indicating that light pulses are being received by the receiving unit 54, and in response thereto the driver 72 generates a signal which is applied to the indicator lamp 76 causing it to emit visible light in proportion to the strength of the signal from the high pass amplifier 62. Thus, optimum alignment of the light source 2 and the light receiving circuitry 54 will result in the lamp 76 emitting the most visible light energy.

An alternative arrangement for the alignment indicator 70 would be to provide an indicator driver 72 which inverts the signal received from the high pass amplifier 62 so that the greater the magnitude of the signal from the amplifier 62, the smaller would be the magnitude of the signal generated by the driver 72. Thus, the lamp 76 would emit light inversely proportional to the strength of the signal from the amplifier 62 so that very little or no light would be emitted when optimum alignment were achieved.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:
1. An optically coupled sensing and control system including
   means for generating light waves,
   lens means for directing said light waves along a first pathway generally in a first direction and for causing said light waves to diverge by a preselected amount along said pathway,
   reflector means for receiving light waves from said lens means and for directing the received waves in a second direction generally opposite said first direction along a second pathway spatially displaced from said first pathway, and
   means responsive to the interruption of light waves in either said first or second pathway for generating a first signal and responsive to receipt of light waves in said second pathway for generating a second signal.

2. A system as in claim 1 further including
   a filter means for substantially filtering out those light waves in the visible spectrum in said second pathway received at said signal generating means and for transmitting therethrough the remaining light waves in said second pathway.

3. A system as in claim 2 wherein said filter means includes first and second polarizers whose polarization axes are oriented at right angles with respect to each other.

4. A system as in claim 1 wherein said light wave generating means includes means for generating pulses of light waves having a certain frequency range and wherein said signal generating means includes means for detecting light wave pulses in said second pathway and for generating a third signal in response thereto, logic means responsive to the generation of a light wave pulse by said light wave pulse generating means for assuming a first condition to thereby generate said first signal and responsive to said third signal for assuming a second condition to thereby generate said second signal, and gate means interconnecting said detecting means and said logic means and responsive to said light wave pulse generating means for assuming a conductive condition for a predetermined period of time after each light wave pulse is generated to thereby allow passage of said third signal from said detecting means to said logic means.

5. A system as in claim 4 wherein said signal generating means further includes timing means connected to said gate means and said logic means and responsive to said first signal for commencing to time over a predetermined interval and for generating a fourth signal at the end of said interval if said third signal is not received from said gate means before the end of said interval, said timing means being responsive to said third signal for terminating the timing operation, and means for applying said fourth signal to said logic means for causing said logic means to assume said second condition.

6. A system as in claim 4 wherein said light wave pulse generating means includes a light-emitting diode responsive to pulses of electrical current for generating corresponding pulses of infrared light waves, means for generatig successive pulses of electrical current, and means for applying said pulses of electrical current to said light emitting diode.

7. A system as in claim 4 wherein said detecting means includes a photo detector positioned in said second pathway for generating a signal whose magnitude is proportional to the intensity of the light in said second pathway and threshold means for generating said third signal when the magnitude of the signal from said photo detector exceeds a first threshold level and for terminating the generation of said third signal when the magnitude of the signal from said photo detector falls below a second threshold level which is less than said first threshold level.

8. A system as in claim 7 further including a second lens means positioned in said second pathway for directing the light waves in said second pathway onto said photo detector, said second lens being positioned relative to the photo detector so that the photo detector is located between said second lens and the focal point of said second lens.

9. A system as in claim 8 further including filter means positioned in said second pathway between said second lens means and said photo detector for substantially filtering out those light waves outside of said certain frequency range and for transmitting therethrough light waves in said certain frequency range.

10. A system as in claim 1 wherein said lens means produces a pathway of light waves which diverges substantially ten degrees.

11. A system as in claim 1 wherein said reflector means includes structure having first and second spaced substantially flat reflective surfaces whose planes are oriented substantially at a right angle with respect to each other, the plane of said first surface being oriented at an angle of substantially 45° with respect to the direction of said first pathway and the plane of said second surface being oriented at an angle of substantially 45° with respect to the direction of said second pathway.

12. A system as in claim 1 further including means responsive to said signal generating means for generating a visual indication of the intensity of the light waves receives by said signal generating means.

13. A system as in claim 1 wherein said signal generating means includes a photo detector positioned in said second pathway for generating a signal whose magnitude is proportional to the intensity of light impinging thereon, said system further including a second lens means positioned in said second pathway for directing light waves in said second pathway onto said photo detector, said photo detector being positioned between said second lens and the focal point of said second lens.

14. An optically coupled sensing and control system including
    means for generating a train of light wave pulses having a certain frequency range,
    means for directing said light wave pulses in a certain pathway,
    means for detecting light wave pulses in said certain pathway and for generating an enabling signal in response thereto,
    logic means which assumes a reset state in response to the generation of a light wave pulse by said light wave pulse generating means and which assumes a set state in response to a signal generated by said detecting means, for generating an output signal when in the set state, and
    gate means interconnecting said detecting means and said logic means and responsive to the generation of a light wave pulse by said light wave pulse generating means for thereafter temporarily opening to allow transfer from said detecting means to said logic means of said enabling signal.

15. A system as in claim 14 further including timing means for causing said logic means to assume the set state a predetermined period of time after said logic means ceases to generate said output signal unless an enabling signal is generated by said detecting means during said predetermined period of time.

16. A system as in claim 14 further including a filter means positioned in said certain pathway near said detecting means for inhibiting the transfer therethrough of light waves having a frequency outside of said certain frequency range.

17. A system as in claim 14 wherein said directing means includes
    lens means for directing the light wave pulses generated by said light wave pulse generating means along a first pathway generally in a first direction, the light waves in said first pathway diverging by a predetermined amount, and
    reflector means for receiving light wave pulses from said lens means and for directing the received light wave pulses in a second direction generally opposite said first direction along a second pathway which is displaced from said first pathway by a predetermined distance.

* * * * *